United States Patent Office 3,652,647
Patented Mar. 28, 1972

---

3,652,647
ESTERIFICATION OF CARBOXYLIC ACIDS WITH EPOXIDES USING A CARBON CATALYST
Edward G. Zey, Corpus Christi, Tex., assignor to Celanese Corporation, New York, N.Y.
No Drawing. Continuation-in-part of application Ser. No. 869,326, Oct. 24, 1969. This application Aug. 3, 1970, Ser. No. 60,719
Int. Cl. C07c 69/54, 69/82
U.S. Cl. 260—475 P
22 Claims

ABSTRACT OF THE DISCLOSURE

Process for the production of β-hydroxyalkyl esters of carboxylic acids by reacting the carboxylic acid with an alkylene monoepoxide utilizing a catalyst which is finely-divided carbon. Specific useful embodiments include the production of bis-(β-hydroxyethyl)terephthalate and the β-hydroxyethyl esters of acrylic and methacrylic acids.

BACKGROUND OF THE INVENTION

This is a continuation-in-part of patent application Ser. No. 869,326, filed Oct. 24, 1969, now abandoned.

The present invention relates to the production of β-hydroxyalkyl esters of carboxylic acids including aromatic polycarboxylic acids. More particularly the present invention relates to the production of β-hydroxyalkyl esters of carboxylic acids by reacting the carboxylic acid with an unsubstituted or halo-substituted alkylene monoepoxide in the presence of a novel catalyst.

The production of β-hydroxyalkyl esters of aromatic carboxylic acids, such as bis-(β-hydroxyethyl) terephthalate has become of significant commercial importance in recent years because these esters may be polymerized to form the linear superpolyesters such as poly(ethylene terephthalate). Such polymers are widely used in textiles, tire cord, and the like. Probably the best known and most widely used method for producing these β-hydroxyalkyl esters is by suspending the carboxylic acid in an inert liquid medium and reacting the carboxylic acid with an alkylene monoepoxide in the presence of a catalyst. Various catalysts and reaction media have been reported in the literature for effecting such a reaction. For example the prior art discloses the use of such reaction media as water, cyclic ethers such as dioxane, ketones, hydrocarbons, halohydrocarbons, nitriles, alcohols, esters such as butyl acetate, dimethyl formamide-water mixtures, and the like. These patents also disclose various catalysts for the esterification, the most successful of which have been the tertiary amine catalysts such as triethylamine or triisopropyl amine. However despite the fact that many catalysts are known for effecting the esterification of aromatic carboxylic acids with alkylene epoxide research is constantly underway for new and more efficient catalysts in view of the commercial importance of polyester fibers. For example tertiary amines while giving good conversion and yields cause many problems during esterification and during subsequent purification and polymerization. In particular these tertiary amine catalysts cause excessive oligomerization of the alkylene epoxide which not only results in a loss of the valuable alkylene epoxide but also results in the formation of esters between the carboxylic acid and the oligomers, these esters being extremely hard to separate from the desired product. Furthermore tertiary amines are very difficult to separate from the reaction zone effluent and thus eventually form nitrogen-bodies which cause discoloration of a polyester formed from the hydroxyalkyl ester.

Similar considerations apply in the preparation of 2-hydroxyalkyl esters of polymerizable aliphatic acids such as acrylic acid.

SUMMARY

It is thus an object of the present invention to provide a process for the production of β-hydroxyalkyl esters of carboxylic acids, especially aromatic dicarboxylic acids and also including acrylic and methacrylic acids. It is also an object of the present invention to provide a novel and efficient catalyst for a process wherein a carboxylic acid such as terephthalic acid is reacted with an alkylene epoxide such as ethylene oxide so as to produce a β-hydroxyalkyl ester of the carboxylic acid. Additional objects will become apparent from the following description of the present invention.

These and other objects are accomplished by the present invention which in one of its aspects is an improvement in a process for the production of β-hydroxyalkyl esters of carboxylic acids wherein, in a reaction zone at temperatures within the range of about 100 to 200° C., the carboxylic acid in an inert liquid medium is reacted with an unsubstituted or halo-substituted vicinal, alkylene monoepoxide in the presence of a catalyst, which improvement comprises using a finely-divided carbon, other than diamond, as a catalyst.

DESCRIPTION OF THE PREFERRED EMBODIMENTS

The finely-divided carbon that is utilized as a catalyst in the present process may be of various types other than diamond and may be what is known as inactive carbon or may be active carbon, the latter being preferred. Active carbons may be generally defined as those which possess adsorptive power. The carbon may be an acid carbon, an alkaline carbon, or a neutral carbon. Whether a particular carbon is acid, neutral or alkaline may be determined by extracting the carbon with water and measuring the pH of that water. For a general discussion of various types of carbon attention is directed to "Industrial Carbon" by C. L. Mantell, published by D. Van Nostrand Co., Inc. of New York. For a more detailed discussion of active carbons attention is further directed to the book "Active Carbon" written by John W. Hassler and published by the Chemical Publishing Company of Brooklyn, N.Y.

Among the particular carbons that may be utilized are graphite, carbon black, lamp black, acetylene black, bone black, vegetable decolorizing carbon, and coconut char as well as various other carbons or chars derived from such things as coal, lignite, waste wood pulp liquor, black ash residues, sawdust, woods, etc. It has been found that those active carbons derived from coal give the best results with the active carbons derived from coconut shells being next best. The finely-divided carbon utilized should generally contain particles smaller than 8 mesh U.S. sieve series (2380 microns), e.g. 8 to 500 mesh U.S. (30 to 2380 microns). Preferably the carbon is smaller than about 200 mesh U.S. (44 microns). In using the carbon catalysts of the present invention, they should generally be present in amounts of about 1 to 30% by weight based on the weight of acid reactant present, preferably 5 to 20% by weight of the acid reactant.

The carboxylic acids which may be esterified according to the present invention may have substituents and groups of a varying nature other than the carboxyl groups as long as these carboxylic acids are free of substituents or groups which are reactive to any appreciable extent under the reaction conditions with each other, with carboxyl groups, or with the alkylene monoepoxide reactant.

The present invention is especially beneficial in esterifying aromatic polycarboxylic acids, as these are generally more difficult to esterify than the monocarboxylic acids.

Generally the aromatic carboxylic acid will be one of the formula:

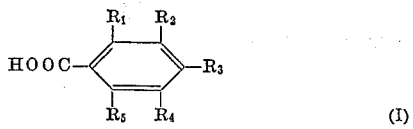

wherein three to five, preferably three or four, of $R_1$–$R_5$ may be hydrogen or haloatoms and wherein zero to two, preferably one or two, of $R_1$–$R_5$ may be a carboxyl group or an organic radical free of ethylenic and acetylenic unsaturation containing a carboxyl-substituted aromatic ring and being composed of atoms selected from the group consisting of halo, carbon, hydrogen and oxygen. When halo substituents are present in the aromatic polycarboxylic acid, chloro is preferred. Preferably the acid to be esterified is a dicarboxylic acid such that in the above Formula I, four of $R_1$ to $R_5$ are chloro or hydrogen and one of $R_1$ to $R_5$, preferably $R_3$ or $R_4$, is a carboxyl group or is a chloro-substituted or non-substituted aromatic group of the formula

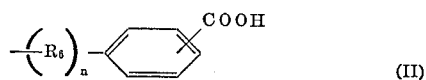

wherein $n$ is 0 or 1 and $R_6$ is oxygen, an alkylene radical or a divalent radical composed of carbon, hydrogen, and oxygen. The present invention is most beneficial in esterifying halo-substituted and non-substituted benzene dicarboxylic acids, especially terephthalic acid. Other than terephthalic acid, among the aromatic acids that may be esterified in accordance with the invention are phthalic acid, isophthalic acid, tetrachloroterephthalic acid, diphenic acid, homophthalic acid, toluic acid, alpha-naphthoic acid, chlorobenzoic acid, salicyclic acid, trimesic acid, 1,2-(ethylenedioxy) paradibenzoic acid, 4,4′-diphenyl dicarboxylic acid, 4,4′-benzophenone dicarboxylic acid, and di(4-carboxyphenyl ether).

In addition to the aromatic acids discussed above, the invention is broadly applicable to the processing of other carboxylic acids, e.g. alkanoic and alkenoic acids, especially lower alkanoic and alkenoic carboxylic and polycarboxylic acids having up to about seven carbon atoms per carboxyl group. For example, as will be discussed more fully in some of the examples to follow, the invention is particularly useful in reacting epoxides and halo-substituted epoxides with acrylic acid or methacrylic acid to form the corresponding hydroxyethyl acrylates or methacrylates, which are useful monomers for the preparation of plastics or coatings. In such applications the present process has substantial advantages over the prior art in avoiding the use of unduly corrosive reaction systems (e.g. those employing strongly acidic catalysts), in minimizing the formation of esters of oligomers of the epoxide reactants, and in preparing products which are of improved purity as compared with those of the prior art. Substituted aliphatic carboxylic acids can be processed as well as simple alkenoic and alkanoic acids; in fact, substituents such as halogens which have the effect of increasing acidity of the acid in question result in an increase of reaction rate as compared with the unsubstituted acids.

The unsubstituted and halo-substituted vicinal alkylene monoepoxides which are utilized as reactants in the present invention are those compounds of the formula

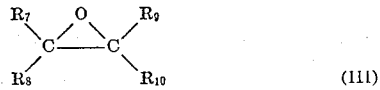

wherein $R_7$, $R_8$, $R_9$, and $R_{10}$ are hydrogen, haloalkyl or alkyl. Usually these monoepoxides contain 2–20 carbon atoms. Preferably the epoxide is a terminal monoepoxide of 2 to 5 carbon atoms with the preferred terminal epoxides being those wherein, in Formula III, $R_7$, $R_8$ and $R_9$ are hydrogen while $R_{10}$ is hydrogen or is an alkyl or haloalkyl group of 1 to 4 carbon atoms. If the epoxide is halo substituted, chloro is preferred although the unsubstituted epoxides are preferred. Ethylene oxide gives the best results of any of the monoepoxides. The monoepoxide reactant should generally be present in amounts of from about 0.5 to 4 equivalents per equivalent of acid reactant, preferably 1.0 to 1.5 equivalents per equivalent of acid. Among the epoxides that may be utilized are propylene oxide, 1,2-butylene oxide, 2,3-butylene glycol, and epichlorohydrin.

The process of the present invention may be conducted in various manners and may be conducted as a batch process or as a continuous process. For example the reaction zone could comprise a plurality of back-mixed reactors in series. Polycarboxylic aromatic acids utilized in the present process are generally very insoluble materials, especially terephthalic acid, and therefore in conducting the process such a carboxylic acid, preferably in a finely-divided form, along with the carbon catalyst is suspended by agitation in the liquid reaction medium and then reacted with the epoxide. The liquid reaction medium is conveniently utilized in amounts of about 1 to 15 times, preferably 4 to 12 times the weight of the acid reactant.

The reactants may be premixed before entering the reaction zone or may be added to the reaction zone in separate streams. Preferably in a continuous process the carboxylic acid and the carbon dispersed in the liquid reaction medium are fed to the reaction zone in one stream while the monoepoxide is introduced to the reaction zone as a separate stream. The $\beta$-hydroxyalkyl ester product, unlike some of the carboxylic acid starting materials, is generally soluble in the reaction medium under the reaction conditions and therefore will generally be entirely soluble in the liquid reaction medium when sufficient amounts of the reaction medium are being used.

The temperatures to be utilized in the present invention may vary from about 100 to 200° C. but are preferably from about 140 to 180° C. The pressures may range from superatmospheric to subatmospheric, the only requirement being that the pressure be sufficient to maintain a liquid phase of the liquid reaction medium. Most often the pressure will be from about 1 to 25 atmospheres. The residence time of the reactants in the reaction zone may vary from about 30 to 300 minutes but will usually be from about 90 to 240 minutes.

The particular method for separating the bis-hydroxyalkyl esters from the effluent of the reaction zone does not constitute a part of the present invention and various methods will be apparent to those skilled in the art. The effluent will usually be comprised of some unreacted monoepoxide, unreacted carboxylic acid, carbon catalyst solids, the liquid reaction medium being used, and the soluble ester product. Such an effluent can be treated for example by first flashing the monoepoxide followed by removal of the acid and filtration of the carbon catalyst, and finally the cooling of the remaining solution of the ester so as to crystallize the ester product. The crystallized ester can then of course be removed by filtration with or without washing or the like. When crystallizing a hydroxyalkyl ester of a carboxylic acid from solution in the liquid medium, the particular temperature to which the solution is cooled to effect crystallization is readily determined and will vary according to the particular ester and the particular liquid medium being used. For example when crystallizing bis($\beta$-hydroxyethyl) terephthalate from chlorobenzene it is preferred to cool the solution to below 30° C. and preferably below 20° C. in order to insure optimum recovery of the diester. The present process may of course be utilized in conjunction with the various purification processes known in the art for the removal of impurities from aromatic esters. For example solutions of the ester may be treated by hydrogenation, sulfite treatment, charcoal treatment, or the like for removal of impurities. The solutions may be formed after the ester is recovered in solid form, or the solution of the ester withdrawn from the reaction zone may be treated prior to the first crystallization.

Inert reaction media for esterifying carboxylic acids with monoepoxides are well known. In general it might be stated that the liquid reaction medium is one which does not to any appreciable extent undergo reaction with the reactants or undergo decomposition under the process conditions. Preferably the reaction medium is one which comprises an organic compound, i.e. an organic compound or mixtures of an organic compound with water, and may even be the β-hydroxyalkyl ester product itself. For example when producing bis(β-hydroxyethyl) terephthalate from terephthalic acid and ethylene oxide, molten bis(β-hydroxyethyl) terephthalate may be the liquid reaction medium. As has been pointed out above, reaction media such as cyclic ethers, ketones, hydrocarbons, water, halohydrocarbons, alkyl esters of alkanoic acids and the like are reported in the literature. Also useful are 2-alkyl dioxolane and 2,2-dialkyl dioxolane reaction media, as well as the nitrobenzene and nitrotoluene reaction media. The preferred liquid reaction medium to be used in the present invention is a hydrocarbon or a halohydrocarbon. Of the hydrocarbons benzene and the alkyl benzenes of about 7–9 carbon atoms such as xylene, ethylbenzene, toluene, and cumene are preferred. Of the chlorohydrocarbons, preferred are the chloroalkanes of 1–6 carbon atoms and chloroaromatics free of ethylenic and acetylenic unsaturation of 6–9 carbon atoms such as 1,1,2-trichloroethane, methylene chloride, chlorobenzene, and p-chlorotoluene.

The following examples are given in order to illustrate specific embodiments of the present invention. Unless otherwise indicated all parts and percentages are on a weight basis.

EXAMPLE I

Several runs were made in which bis(β-hydroxyethyl) terephthalate was produced from ethylene oxide and terephthalic acid utilizing a finely divided carbon catalyst which was of such a size that it passed through 325 mesh U.S. In each of the runs 20 grams of the carbon catalyst, 150 grams terepthalic acid, 100 grams ethylene oxide and 2 liters of chlorobenzene solvent were added to a 2.5 liter autoclave fitted with steam jacket and mechanical stirrer. The autoclave was then sealed and heated with stirring to 160° C. for about 2 hours after which the contents of the autoclave were flashed to remove ethylene oxide, the remaining slurry filtered hot to remove the unreacted terephthalic acid and the carbon catalyst, and finally the bis(β-hydroxyethyl)terephthalate recovered by cooling the mother liquor to about 25° C. so as to effect crystallization of the diester from solution. The following Table I indicates the type of catalyst utilized in each run as well as the amount of the terephthalic acid charged to the reactor which was converted to bis(β-hydroxyethyl) terephthalate.

TABLE I

| Run number | Type carbon | Terephthalic acid conversion, percent |
|---|---|---|
| 1 | Nuchar C-N | 31 |
| 2 | Pittsburgh Type CAL | 81 |
| 3 | Pittsburgh Type C | 71 |
| 4 | Cocoanut | 41 |
| 5 | Animal bone | 60 |
| 6 | Wood char | 37 |
| 7 | Lampblack | 24 |
| 8 | Graphite | 25 |
| 9 | Blank run (no catalyst) | 12 |

Pittsburgh Type CAL carbon is the trademark of Pittsburgh Activated Carbon Company and is an activated decolorizing carbon made from bituminous coal. Pittsburgh Type C is also the trademark product of Pittsburgh Activated Carbon Company for an activated carbon made from coal. Nuchar C-N is a trademarked product of West Virginia Pulp and Paper Company for an activated carbon made from paper-mill waste liquors.

EXAMPLE II

In order to illustrate the effect of pretreating the carbon catalyst by acid washing, neutral washing, and alkaline washing, three runs were made in accordance with the procedure of Example I except that only 10 grams catalyst was utilized, a xylene solvent was utilized, and the temperature was 140° C. for one hour. The acid-washed catalyst was prepared by treating the carbon with 100 milliliters of 1 molar sulfuric acid at 80° C. for one hour with stirring followed by heating the carbon at 140° C. for 1.5 hours under vacuum. The neutral and alkaline-washed carbons were likewise prepared using water and 1 molar sodium hydroxide. The carbon utilized was Type CPG, the trademarked activated carbon of Pittsburgh Activated Carbon Company, and contained particles of 325 mesh U.S. and smaller. The following Table II shows the amount of terephthalic acid converted to bis(β-hydroxyethyl) terephthalate in each run as well as the particular catalyst utilized in each run.

TABLE II

| Run number | Type catalyst | Terephthalic acid conversion, percent |
|---|---|---|
| 1 | Acid wash | 10 |
| 2 | Neutral wash | 13 |
| 3 | Alkaline wash | 13 |

EXAMPLE III

In order to illustrate that various types of solvents may be utilized in the process of the present invention, the following Table III illustrates the results obtained from several runs for the production of bis(β-hydroxyethyl) terephthalate. All of the runs were carried out in the equipment and to the procedure of Example I except with the charge to the reactor consisting of 10 grams Pittsburgh Type CPG carbon of 325 mesh U.S. and smaller, 150 grams terephthalic acid, 100 grams ethylene oxide and 2 liters solvent. The reaction was carried out at 160° C. for one hour.

TABLE III

| Run number | | Terephthalic acid conversion, percent |
|---|---|---|
| 1 | Xylene | 51 |
| 2 | Chlorobenzene | 40 |
| 3 | Water | 21 |
| 4 | Methylene chloride | 44 |
| 5 | Dioxane | 44 |
| 6 | 2,6-dimethyl-4-heptanone | 37 |
| 7 | Nitrobenzene | 29 |
| 8* | Bis(β-hydroxyethyl) terephthalate | 44 |
| 9 | 1,1,2-trichloroethane | 45 |

*Run carried out using 20 g catalyst and 1800 g molten bis(β-hydroxyethyl) terephthalate as solvent.

EXAMPLE IV

A solution of 2 liters of chlorobenzene containing 124 g. toluic acid, 50 g. ethylene oxide and 20 g. Type C Pittsburgh pulverized carbon, all of which had been passed through a 325 mesh (44 micron) U.S. sieve, was heated at 160° C. for 3 hours in a stirred autoclave. The pressure of the reactor was held constant throughout the course of the reaction with make-up ethylene oxide. The reaction mixture was filtered at 125° C. to remove carbon catalyst and stripped of chlorobenzene solvent. The residue was dissolved in diethyl ether, extracted with aqueous sodium bicarbonate (to remove unreacted toluic acid) and concentrated by distilling off the ether, which afforded a crude hydroxyethyl toluate in 86% yield. Distillation of this material afforded a 74% yield of the pure ester—β-hydroxyethyl toluate.

EXAMPLE V

A solution of 2 liters of chlorobenzene containing 150 g. terephthalic acid, 212 g. epichlorohydrin and 20 g. Type C Pittsburgh pulverized activated carbon, all of which was passed through a 325 U.S. sieve, was heated at 160° C. for 4 hours. The ester product was obtained after the reaction mixture was filtered hot, to remove carbon catalyst and unreacted terephthalic acid, and distilled to remove the solvent. The product consisted of a mixture of bis - (3 - chloro - 2 - hydroxypropyl) terephthalate, bis - (1 - methyl - 1 - chloro - 2 - hydroxyethyl) terephthalate, and the mixed (3 - chloro - 2 - hydroxypropyl)-(1 - methyl - 1 - chloro - 2 - hydroxyethyl) diester of terephthalic acid.

EXAMPLE VI

The bis($\beta$-hydroxyethyl) ester of 1,2-(ethylenedioxy) p-dibenzoic acid, which is also called the di(p-carboxyphenyl) ether of ethylene glycol, was prepared as follows. A mixture of 2 liters of chlorobenzene, 100 grams of the acid, 100 grams of ethylene oxide, and 20 grams of Type C Pittsburgh activated carbon which had been passed through a 25 mesh U.S. sieve (44 microns) was heated at 160° C. for 3 hours in a stirred autoclave. The resulting reaction mixture was filtered at 125° C. to remove the solids, after which the filtrate was concentrated and cooled to 27° C. Crystals of the ester were obtained in 30% yield.

EXAMPLE VII

A solution of 65.7 grams of acrylic acid in 2 liters of benzene was treated with 100.4 grams of ethylene oxide in the presence of 30 grams of pulverized carbon (Pittsburgh, Type CPG) along with 2 grams of hydroquinone at 150° C. for 5 hours. The initial pressure was adjusted to approximately 10 atmospheres at 160° C. with a nitrogen blanket. The ethylene oxide was introduced by adding 50.2 grams initially and thereafter 12.5 grams at hourly intervals for 4 hours. The reaction mixture was filtered hot to remove the carbon, treated with three 100 ml. portions of saturated sodium bicarbonate, dried with magnesium sulfate, and solvent-stripped to produce 61 grams of the crude hydroxyethyl ester. This material was then distilled to yield 58 grams of the ester as a colorless liquid boiling at 75–77° C. at 2.6 millimeters.

In the same manner as above, the hydroxyethyl ester of methacrylic acid was prepared by reacting 78 grams of methacrylic acid with 100.4 grams of ethylene oxide in the presence of 30 grams of the same Pittsburgh Type CPG carbon along with 2 grams of hydroquinone in 2 liters of toluene as reaction solvent. After a product workup similar to that just described above, 29.5 grams of the desired ester product was obtained, having a boiling point of 56–60° C. at 0.25 millimeters.

The 2-hydroxypropyl ester of acrylic acid was also prepared in the same manner as described above for the preparation of hydroxyethyl acrylate, with 1,2-propylene oxide being substituted, of course, for the ethylene oxide used in the reaction. A mixture of the corresponding hydroxypropyl esters of acrylic acid was recovered from the reaction product in 22% yield, the mixture being approximtaely 60% 2-hydroxypropyl acrylate and 40% 1-hydroxyisopropyl acrylate.

The embodiments of the invention in which an exclusive property or privilege is claimed are defined as follows:

1. In a process for the production of $\beta$-hydroxyalkyl esters of carboxylic acids wherein in a reaction zone at temperatures within the range of about 100 to 200° C. the carboxylic acid in an inert liquid medium is reacted with an unsubstituted or halo-substituted vicinal, alkylene monexposide in the presence of a catalyst, the improvement which comprises using a finely-divided carbon other than diamond as a catalyst.

2. The process of claim 1 wherein said acid is an aromatic acid and said monoepoxide is one of the formula

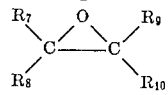

wherein $R_7$, $R_8$, $R_9$ and $R_{10}$ are hydrogen, haloalkyl, or alkyl.

3. The process of claim 2 wherein there are from about 1.0 to 1.5 equivalents of the monoepoxide for each equivalent of the aromatic carboxylic acid and wherein the acid is a polycarboxylic acid.

4. The process of claim 2 wherein said carbon is an active carbon and the residence time of the reactants in the reaction zone is from about 30 to 300 minutes.

5. The process of claim 2 wherein the inert liquid medium is an alkylbenzene of 6 to 9 carbon atoms, a haloalkane of 1 to 6 carbon atoms or a halo aromatic compound free of ethylenic and acetylenic unsaturation of 6 to 9 carbon atoms.

6. The process of claim 2 wherein the liquid medium is present in amounts of from about 4 to 12 parts by weight per part by weight of the aromatic carboxylic acid.

7. The process of claim 2 wherein the catalyst is an active carbon which is derived from coal.

8. The process of claim 2 wherein the aromatic carboxylic acid is a benzene dicarboxylic acid or a halo-substituted benzene dicarboxylic acid.

9. The process of claim 2 wherein the aromatic carboxylic acid is terephthalic acid.

10. The process of claim 2 wherein the carbon is present in amounts of from about 5 to 20% by weight based on the weight of the aromatic carboxylic acid present.

11. The process of claim 2 wherein the aromatic carboxylic acid is terephthalic acid, the monoepoxide is ethylene oxide and the ester produced is bis-($\beta$-hydroxyethyl) terephthalate.

12. The process of claim 1 wherein said monoepoxide is a terminal epoxide of 2 to 5 carbon atoms of the formula

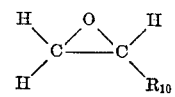

wherein $R_{10}$ is hydrogen, haloalkyl or alkyl.

13. In a process for the production of bis-($\beta$-hydroxyethyl) terephthalate wherein in a reaction zone at temperatures within the range of about 100 to 200° C. terephthalic acid suspended in from about 1 to 15 times its weight of an inert liquid medium is reacted with ethylene oxide present in amounts of from about 0.5 to 4 equivalents per equivalent of terephthalic acid in the presence of a catalyst, the improvement which comprises using a finely-divided active carbon as a catalyst.

14. The process of claim 13 wherein the active carbon is present in amounts of from about 1 to 30 weight percent based on the weight of the terephthalic acid.

15. The process of claim 14 wherein the active carbon is one derived from coal and is smaller than 8 mesh U.S.

16. The process of claim 14 wherein the inert liquid medium is an alkylbenzene of 6 to 9 carbon atoms, a haloalkane of 1 to 6 carbon atoms or a halo aromatic compound free of ethylenic and acetylenic unsaturation of 6 to 9 carbon atoms.

17. The process of claim 16 wherein the temperature is 140 to 180° C., wherein the ethylene oxide is present in amounts of from about 1.0 to 1.5 equivalents per equivalent of terephthalic acid, wherein the inert liquid medium is present in amounts of about 4 to 12 parts by weight per part by weight of terephthalic acid, wherein the residence time of the reactants in the reaction zone is from about 90 to 240 minutes, and wherein the active carbon is present in amounts of from about 5 to 20% by weight based on the weight of terephthalic acid.

18. In the process for reacting an alkenoic acid with an unsubstituted or halo-substituted vicinal alkylene monoepoxide in an inert liquid medium in the presence of a catalyst at a temperature within the range of about 100 to 200° C. to produce a $\beta$-hydroxyalkyl ester of said acid, the improvement which comprises employing as catalyst a finely-divided carbon other than diamond.

19. The process of claim 18 wherein the acid is a lower alkenoic acid and the monoepoxide is of the formula

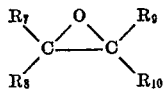

wherein $R_7$, $R_8$, $R_9$, and $R_{10}$ are hydrogen, haloalkyl, or alkyl.

20. The process of claim 19 wherein the acid is a member of the group consisting of acrylic acid and methacrylic acid and wherein the monoepoxide is a member of the group consisting of ethylene oxide and 1,2-propylene oxide.

21. The process of claim 20 wherein the carbon is an activated carbon.

22. The process of claim 21 wherein the liquid medium is a member of the group consisting of benzene and the alkylbenzenes of about 7 to 9 carbon atoms.

References Cited

UNITED STATES PATENTS 2,013,318   9/1935   Rosanstow et al. ____ 260—475 P

OTHER REFERENCES

Tsutsumi et al., as cited in Chem. Abstracts, 49, 1416 (1955).

JAMES E. PATTEN, Primary Examiner

E. J. SKELLY, Assistant Examiner

U.S. Cl. X.R.

260—410.6, 469, 473 R, 474, 476 R, 485 G, 486 B, 487, 496